Figure 1:
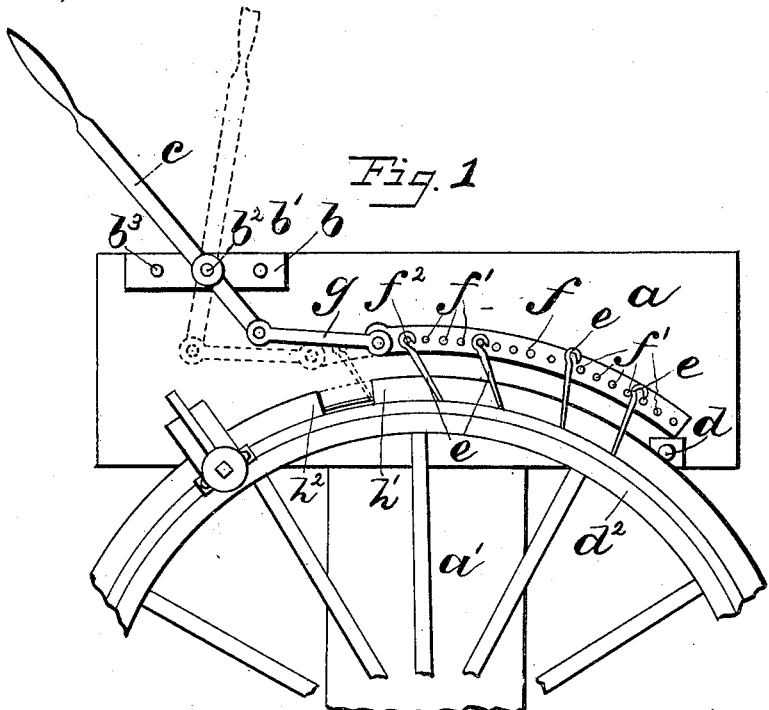

No. 662,650. Patented Nov. 27, 1900.
A. S. KROTZ.
RUBBER TIRE SETTER.
(Application filed Feb. 26, 1900.)

(No Model.)

Witnesses
F. L. Walker
Chas. I. Welch

Inventor
Alvaro S. Krotz
By his Attorney
Paul A. Staley

UNITED STATES PATENT OFFICE.

ALVARO S. KROTZ, OF SPRINGFIELD, OHIO, ASSIGNOR TO THE CONSOLIDATED RUBBER TIRE COMPANY, OF NEW YORK, N. Y.

RUBBER-TIRE SETTER.

SPECIFICATION forming part of Letters Patent No. 662,650, dated November 27, 1900.

Application filed February 26, 1900. Serial No. 6,436. (No model.)

*To all whom it may concern:*

Be it known that I, ALVARO S. KROTZ, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to improvements in devices for use in applying rubber tires to vehicle-wheels; and it consists of a device for closing the space between the ends of the rubber after the ends of the retaining-bands have been tightened and fastened. It particularly refers to a device for drawing together the ends of the rubber tires, which are of the quadrangular shape shown in the drawings, employing one or more retaining-wires. In said drawings I have shown a single retaining-band; but this device can be used equally well with tires employing two or more retaining-bands.

Figure 2:
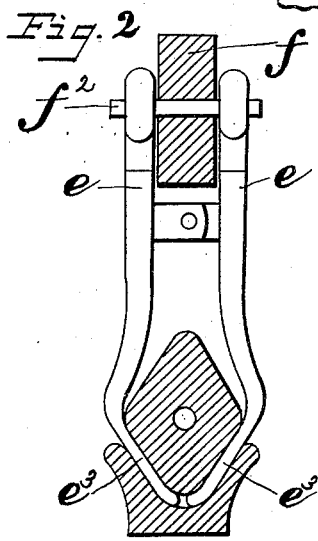
Figure 3:
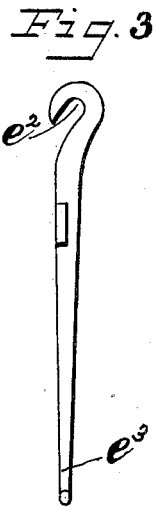
Figure 4:
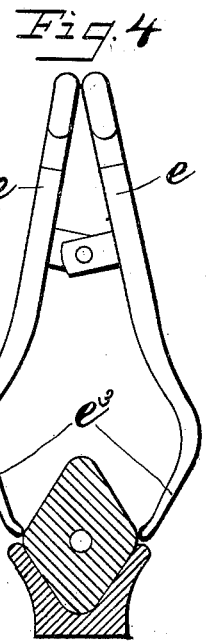

In the drawings, Figure 1 is a plan view of my device, together with a portion of the rubber-tired wheel. Fig. 2 is a sectional view of the rubber tire and pulling-bar, with one pair of pulling-tongs in position for use. Fig. 3 is a detailed view of one member of the pulling-tongs used in my device. Fig. 4 is a view to show the position of the tongs when the pulling device is being removed from the rubber tire.

Like parts are represented by similar letters of reference in the several views.

In applying the rubber tires to the vehicle-wheels it is found desirable to place the rubber, with the band or bands of metal extending through the said rubber, within the channel-iron of the rim of the wheel before fastening together the ends of the retaining-bands. In making this application of rubber to the rim of the wheel a space between the ends of the rubber strip is necessarily formed at the point where the ends of the bands are to be fastened for the purpose of giving ready access to the retaining wires or bands, and though the rubber is compressed before it is placed within the channel the friction between the channel and the rubber is such that it is necessary to provide means for closing the space formed at said joint, and in the construction described herein I have provided devices for closing this space.

In the said drawings, $a$ represents the bed or table, upon which I mount the block $b$, having the pins $b'$ $b^2$ $b^3$ projecting from its upper surface, any one of which may serve as a fulcrum for the lever $c$, which is formed to fit over any one of said pins. There is also mounted on this bed or table a block with stop-pin $d$, against which the wheel $d^2$ is supported upon the table $a'$, as shown in Fig. 1. The lever $c$ is connected at its lower end to the pulling-bar $f$ by the link $g$. Said pulling-bar is perforated its entire length by a series of holes $f'$, in which holes are inserted pins $f^2$, and these pins extending beyond the sides of the pulling-bar engage with hooks $e^2$ of the tongs, and thus form supports for said pulling-tongs. Before the ends of the retaining-bands are fastened, the tongs $e$ $e$, formed at the upper ends with hooks $e^2$, as shown in Fig. 3, are fitted under the rubber, clamping the bottom and sides thereof. Said tongs are arranged so that one pair is placed back of the other, and in order that the pulling or stretching of the rubber may be uniform the pair of tongs $e$ nearest the end $h'$ of the rubber are first engaged with the pulling-bar $f$, and after a slight movement of that end of the rubber has been made the second pair of tongs is engaged with the pulling-bar, and after further movement the third and each successive pair is made to engage with the pulling-bar $f$. In applying the tongs to the rubber the lower part $e^3$ of the tongs, which is shaped to conform to the outer curves of the rubber tire, is placed around and under the tire, said portion $e^3$ engaging the bottom and sides of said tire. The upper ends of each member of said tongs are provided with hooks $e^2$, which, as stated, engage with the pins of the pulling-bar. The prongs of each pair of tongs are pivoted together at their upper ends, as shown in Figs. 2 and 4, and it can readily be seen that for the purpose of disengaging the lower ends of said tongs from the rubber tire the upper or hook portion of the tongs can be forced together after the same are unhooked from the pulling-bar, as shown in Fig. 4, and the tongs $e$ $e$ can then be removed from the rubber tire.

In operation when the lever $c$ is moved to the position as shown in the dotted lines in Fig. 1 the pulling-bar, having been connected with the tongs, will be moved along until the bar, link, and lever assume the position as shown in dotted lines, at which point the two ends of the rubber will be brought together. It is readily seen that, if desired, the lever $c$ may be moved to any pin in the block $b$, according to whether a greater or less amount of movement is required. After the ends $h'$ $h^2$ $h^3$ are drawn together, as just described, said pulling-tongs $e$ $e$ can be easily removed by first disengaging the upper ends from the pulling-bar and then forcing the lower ends out of engagement with the rubber heretofore described. While said tongs are engaged with the pulling-bar, the lower ends of same are maintained in engagement with the rubber by reason of the pulling-bar preventing the upper ends from being forced together, as fully shown in Fig. 2. I have thus shown means by which the rubber will be drawn back against the friction of the rubber with the channel to a position which it will maintain after the tongs have been removed.

For matter shown but not claimed reference is had to my application Serial No. 6,435.

Having thus described my invention, I claim as follows:

1. In a pulling device, the combination with a series of pulling members, each of which consists of two prongs pivotally connected near their middle points, said prongs being so shaped as to conform to and grip the sides of the rubber tire, of a pulling-bar adapted to support said pulling members and means for pulling said bar, substantially as specified.

2. In a device for pulling rubber tires, the combination with a pulling-bar, of tools pivotally connected in pairs the lower ends of which are adapted to grip the rubber tire on the sides thereof, and the shanks of which pivotally engage said bar, and means for pulling said bar, substantially as specified.

3. In a pulling device for equipping vehicle-wheels with rubber tires, the combination with a pulling-bar formed with a series of holes, of tong-tools the shanks of which engage pins passing through said holes and means for pulling said bar and tongs for closing the space between the ends of said rubber tire, substantially as specified.

4. In a pulling device for rubber tires, the combination with a pulling-bar, of a series of tongs with their jaws formed to conform to the sides of the rubber tire and their upper ends removably, pivotally engaging said bar and means for pulling said bar, substantially as specified.

5. In a pulling device for rubber tires, the combination with a pulling-bar containing a series of holes, of a series of pulling-tongs, the jaws of which are adapted to grip the sides of the rubber tire and the shanks of which removably pivotally engage on opposite sides of the pulling-bar, pins passing through the holes in said bar and means for moving said bar, substantially as specified.

In testimony whereof I have hereunto set my hand this 13th day of September, A. D. 1899.

ALVARO S. KROTZ.

Witnesses:
  CHAS. I. WELCH,
  EDMOND J. OGDEN.